(12) United States Patent
Mishra et al.

(10) Patent No.: US 11,239,666 B2
(45) Date of Patent: Feb. 1, 2022

(54) ENERGY-STORAGE INTEGRATED APPLICATION DEVICE AND OPERATION THEREOF

(71) Applicant: SIGNIFY HOLDING B.V., Eindhoven (NL)

(72) Inventors: Priya Ranjan Mishra, Eindhoven (NL); Matthias Wendt, Eindhoven (NL); Harald Josef Günther Radermacher, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 83 days.

(21) Appl. No.: 16/638,865

(22) PCT Filed: Jul. 30, 2018

(86) PCT No.: PCT/EP2018/070609
§ 371 (c)(1),
(2) Date: Feb. 13, 2020

(87) PCT Pub. No.: WO2019/034400
PCT Pub. Date: Feb. 21, 2019

(65) Prior Publication Data
US 2020/0366102 A1     Nov. 19, 2020

(30) Foreign Application Priority Data

Aug. 14, 2017  (IN) .............................. 201741028830
Oct. 18, 2017  (EP) ...................................... 17197138

(51) Int. Cl.
*H02J 5/00*      (2016.01)
*H02J 7/00*      (2006.01)
*H05B 47/185*   (2020.01)
*H04B 3/54*      (2006.01)

(52) U.S. Cl.
CPC ............ *H02J 5/00* (2013.01); *H02J 7/00032* (2020.01); *H02J 7/0047* (2013.01); *H04B 3/548* (2013.01); *H05B 47/185* (2020.01)

(58) Field of Classification Search
CPC ........ H02J 5/00; H02J 7/00032; H02J 7/0047; H05B 47/185; H04B 3/548; H04B 3/54; H04B 2203/547
(Continued)

(56) References Cited

U.S. PATENT DOCUMENTS 4,926,158 A    5/1990  Zeigler
8,274,232 B2 * 9/2012  Nerone .................. H04B 3/544
                                                              315/209 R
(Continued)

FOREIGN PATENT DOCUMENTS

CN       1602007 A     3/2005
CN    103155432 A      6/2013
(Continued)

OTHER PUBLICATIONS

Wikipedia, "Broadband Over Power Lines", Sep. 29, 2019, 1 page; webpage: https://en.wikipedia.org/w/index.php?title=Broadband_over_power_lines&printable=yes.

*Primary Examiner* — Hal Kaplan

(57) ABSTRACT

The present invention relates to an application device comprising an integrated energy storage, an application controller and a method of operating an application system, supporting different operation modes. In a first operation mode, AC power is provided via a distribution line to operate the application device. In a second mode, the AC power transmission at the distribution line is replaced by data communication, wherein the application device is run by energy from the energy storage during the second operation mode. Preferably in a third operation mode, DC power from the
(Continued)

energy storage of an application device may be provided via the distribution line to another application device.

15 Claims, 3 Drawing Sheets

(58) Field of Classification Search
USPC .......................................................... 307/2, 22
See application file for complete search history.

(56) References Cited

U.S. PATENT DOCUMENTS

| | | | |
|---|---|---|---|
| 8,338,981 B2 * | 12/2012 | Biegert | H04J 3/1694 |
| | | | 307/3 |
| 9,369,178 B2 * | 6/2016 | Matsutani | H04B 3/548 |
| 9,800,612 B2 * | 10/2017 | Harvey | H04W 12/12 |
| 2011/0176807 A1 | 7/2011 | Biegert | |
| 2012/0032608 A1 | 2/2012 | Nerone | |
| 2013/0182781 A1 | 7/2013 | Matsutani | |
| 2015/0334131 A1 | 11/2015 | Harvey et al. | |

FOREIGN PATENT DOCUMENTS

| | | |
|---|---|---|
| CN | 104335448 A | 2/2015 |
| CN | 106787114 A | 5/2017 |
| EP | 0038877 A1 | 11/1981 |
| EP | 1062845 A1 | 12/2000 |
| EP | 2458946 A1 | 5/2012 |
| EP | 2602941 A1 | 6/2013 |
| GB | 2335334 A | 9/1999 |
| WO | 2013182927 A2 | 12/2013 |

* cited by examiner

ENERGY-STORAGE INTEGRATED APPLICATION DEVICE AND OPERATION THEREOF

CROSS-REFERENCE TO PRIOR APPLICATIONS

This application is the U.S. National Phase application under 35 U.S.C. § 371 of International Application No. PCT/EP2018/070609, filed on Jul. 30, 2018, which claims the benefit of European Patent Application No. 17197138.5, filed on Oct. 18, 2017, which claims the benefit of Indian Patent Application No. 201741028830, filed on Aug. 14, 2017. These applications are hereby incorporated by reference herein.

FIELD OF THE INVENTION

The present invention relates to smart application systems, in particular lighting systems, used in building/household management systems. More particularly, the present invention relates to an application device and application controller operable in different modes to support the exchange of power and communication signals.

BACKGROUND OF THE INVENTION

Lighting appliances are growing from just passive devices for fixed constant power illumination to interactive devices. They become smart devices actively participating in creating customized ambience or contributing to energy management in building management systems. The smart operations require communication among lighting devices as well as with a central control, which may be realized by wired or wireless communication, such as e.g. zigbee, wifi, dali or Ethernet. In order to implement such communication, additional infrastructure is needed which results in higher cost and a higher complexity of the system. Alternatively, power line communication (PLC) can be used to transmit both data and power on a common power distribution line. However, in power line communication systems, each device needs dedicated PLC chipsets to transmit and receive data on a power line. The power line is prone to noise due to changes in load patterns or switching on the energy distribution grid. In PLC there is thus need to superimpose data trans-missions on power transmissions or extract data signals from embedded voltage/power signals. This results in data corruption due to noise in the power system and complex circuitry is needed at both transmitter and receiver end, which again results in increased costs and complexity of the system.

To overcome costly chipsets U.S. Pat. No. 9,369,178 suggests communication and power transmissions between multiple power processing units in two modes. In a normal mode, power conversion takes place at normal frequency and in communication mode, switching happens at two frequencies different from the normal frequency. Different devices identify message by observing a periodic pattern of glitches and kinks on the power line. This method needs robust and sensitive filter circuitry to remove noise due to power conversion circuits.

WO 2013/182927 A2 discloses a lighting network comprising a plurality of lighting units that can operate on AC power and DC back up power if the AC power is removed. A controller is used to redistribute the DC power between the plurality of lighting units in the event that DC power is low or exhausted in one of the plurality of lighting units

SUMMARY OF THE INVENTION

In view of the above it is an object of the present invention to provide an improved solution for communication as well as power transmission within an application system, in particular a lighting system, while keeping the complexity of the application system low.

This object is achieved by an application device and an application controller according to the present invention.

According to a first aspect of the invention, an application device, in particular a lighting device, is provided, comprising an energy storage, and a signal port connectable to a distribution line and configured to, in a first mode, receive power from an AC power source for operating the application device, and in a second mode, exchange data via the distribution line, wherein the first and second modes are applied consecutively and wherein the application device is powered with energy from the energy storage during the second mode.

The application device may be any device usable in an application associated with building management systems, such as lighting applications, heating, ventilation and air conditioning (HVAC) applications, etc. Such devices can be—but are not limited to—luminaires, lamps, sensors and user interfaces which are connected via distribution lines in a grid. Sensors and user interfaces may provide data on the basis of which the operation of luminaires and lamps may be controlled. The application devices may comprise application drivers to run a respective load, e.g. lamps may be run by lamps drivers. The application device comprises a signal port connectable to a distribution line wherein the signal port may have one or more contact pins. The distribution line may comprise one or more wires to be used for signal transmission wherein the signals transmitted may be used for AC power transmission in a first mode and for data transmission in a second mode. During the first mode, the application device is operated based on the AC power provided via the distribution line. During the second mode, the application device is operated based on power provided by an internal energy storage, such as a battery. Preferably, the energy storage is rechargeable, such that during the first mode, the application device is operated and the battery is recharged via a energy storage charger using the AC power provided via the distribution line. In the second mode, the application device is run by power from the energy storage. The application device, is thus no longer fed by power from an external AC power source such that noise arising from power transmission via the distribution line is not present during the second mode. Accordingly, data transmissions via the distribution lines do not suffer from noise arising from AC power transmissions such that the application device does not require circuitry to filter data transmissions suffering from noise. The energy storage may preferably be chosen such that the capacity is sufficient to provide energy for the operation of the application device in the second mode for a time period required to transmit the respective data, e.g. control commands, measurements updates/reports, configuration updates, etc. This time period usually ranges between a few seconds to a few minutes.

In an embodiment of the present invention, the signal port is further adapted to receive in a third mode, power from a DC power source for operating the application device. The DC power source may be a battery of one or more application devices connected to the same distribution line. Preferably, the power from the DC power source may also be used for charging the energy storage by the energy storage charger. That way, energy may be distributed among application devices to guarantee operation of the respective application devices at a required operation status. This mode may be used in case of the AC mains power glitch and serve as an emergency mode to continue operation of the respective application devices. It may also be applied, in case the quality of the AC power is not sufficient.

In an embodiment of the present invention, the signal port is further adapted to transmit, in a third mode, power from the energy storage onto the distribution line. As described hereinabove, in case of AC mains power glitches or an insufficient quality of the AC power, the application device may provide energy to other application devices connected to the distribution line in order to support proper operation of other application devices connected to the distribution line.

Preferably, in the third mode, the signal port is further adapted to transmit or receive data modulated onto the DC power signal. Any known modulation scheme may be applied for DC power transmissions. Additional data modulations onto the DC power signal may be of particular advantage in order to transmit urgent messages, for instance emergency transmissions relating to critical energy statuses of respective application devices or the like. In such cases, the data modulations onto the DC power signal allow not to await a change to the data communication mode.

In an embodiment of the present invention, the application device further comprises circuitry to monitor a status of the energy storage and submit a signal to an external controller, if the energy stored by the energy storage falls below a predetermined threshold to request operation in the first mode.

In an embodiment of the present invention, the application device further comprises a bidirectional current controller and a communication module, both connectable to the distribution line, wherein in the first mode, the current controller is connected to the distribution line to receive power from the external AC power source and the communication module is disconnected from the distribution line, in the second mode, the current controller is disconnected from the distribution line and the communication module is connected to the distribution line, and in a third mode, the current controller is connected to the distribution line to receive DC power from an external DC power source or to provide power from the energy storage to the distribution line. The current controller may be controlled by a central controller or may be controlled in an autonomous fashion dependent on the state of the energy storage level and the operation status of the application device. For instance, if a luminaire is only operated at a low dimming level and thus only requires reduced power from the energy storage in the second mode, the central controller may instruct the application device to provide energy from the energy storage to other application devices via the distribution line. Alternatively, the control decision may also be determined by control circuitry at the application device. By connecting and disconnecting the current controller and the communication module respectively, during the respective mode, it is prevented that undesired energy flows occur.

In an embodiment of the present invention, the application device further comprises a modulation-demodulation module connected to the bidirectional current controller, to modulate data on the DC power signal provided to the distribution line or to demodulate data received with the DC power signal.

In a further aspect of the present invention, an application controller comprising a signal port connectable to a distribution line is provided, wherein the application controller is configured to, in a first mode, control an AC power source to connect to the distribution line to provide power to an application device via the distribution line, in a second mode, control the AC power source to disconnect from the distribution line and to send a data transmission to the application device or to receive a data transmission from the application device, wherein the application controller switches between the first and second mode. By disconnecting the AC power mode for the distribution line during data communication mode, noise from the AC power source is prevented from interfering with the data communication, whereby the quality of the data communication is increased rendering complex noise filter circuitry at the application devices redundant.

In an embodiment of the present invention, the application controller is configured to switch from the second mode to the first mode upon receipt of a signal from the application device indicating that a power stored by the energy storage of the application device has fallen below a predetermined threshold. In order to avoid power outages of respective application devices which are run on battery power during the second mode, the application controller is configured to switch from the second mode to the first mode upon receipt of a signal from the application device indicating that a power stored by the energy storage of the application device has fallen below a predetermined threshold.

In an embodiment of the present invention, the application controller further comprises a monitoring unit for monitoring a quality of the AC power in the first mode, wherein the controller is configured to control the application device to switch to a third mode in which DC power is provided by an energy storage of the application device and transmitted via the distribution line as a power signal with or without a modulated data signal when the quality of the AC power drops below a certain value.

Preferably, the monitoring unit comprises a phase-looked loop detector to detect a zero crossing of the AC voltage to determine the AC frequency and wherein the controller is configured to control the application device to switch to the third mode, if the AC frequency deviates from a nominal frequency by a predetermined amount.

In an embodiment of the present invention, the application controller further comprises a monitoring unit for monitoring costs of the AC power in the first mode, wherein the controller is configured to control the application device to switch to a third mode in which DC power is provided by an energy storage of the application device and transmitted via the distribution line as a power signal with or without a modulated data signal when the quality of the AC power drops below a certain value.

In a further aspect of the present invention, a method for operating an application system is presented comprising one or more application devices and an application controller, the method comprising: in a first mode, controlling an AC power source to connect to the distribution line to provide power to an application device via the distribution line, in a second mode, controlling the AC power source to disconnect from the distribution line and enabling data transmission between the one or more application devices and between the one or more application devices and the application controller, in a third mode, controlling the AC power source to disconnect from the distribution line and enabling DC power transmissions between the one or more application devices.

Preferably, the method may be implemented as a computer program, wherein the computer program is executable in a processing unit of an application controller, the computer program comprising program code means for causing the processing unit to carry out a method as defined herein above when the computer program is executed in the processing unit.

It shall be understood that the application device of claim 1 and the application controller of claim 10 and the method for operating an application system of claim 15, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
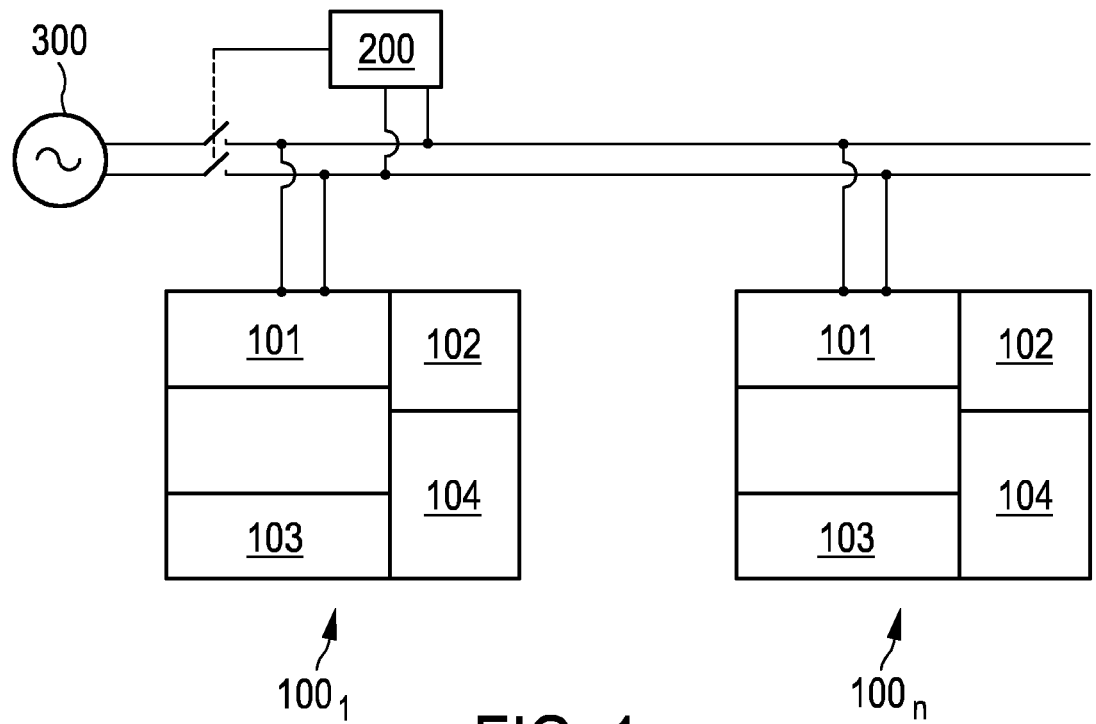
FIG. 1 exemplary and schematically shows an application system comprising an application device and an application controller according to an embodiment of the present invention.

FIG. 1 exemplary and schematically shows an application system for communication and power transfer between a central application controller 200 and application devices $100_1$ to $100_n$ with integrated energy storage 102, in particular lighting devices, such as luminaires, lamps, sensors, user interfaces. Further examples of application device $100_1$ to $100_n$ are any devices exploited in modern building management systems, e.g. heating, ventilation and air conditioning (HVAC) applications.

The transmission of data communication or AC power via the same distribution line occurs sequentially one after another, such that there is no noise from AC power transmissions during data communication. Accordingly, there is no need for complex circuitry or protocols to extract the information from data embedded in power transmissions. Depending on the power consumption of the application device, the energy storage 102 may be a normal capacitor (e.g. for a user interface), a super capacitor (e.g. for a low wattage lamp) or a rechargeable battery (e.g. for a high wattage luminaire).

Wherein the embodiment in FIG. 1 shows a central application controller 200 external from the application devices $100_1$ to $100_n$. However, the application controller 200 may also be integrated into one of the application devices $100_1$ to $100_n$ or its functionality may also be distributed over multiple devices within a application system. The application controller 200 is thus to be understood as a functional unit rather than necessarily as a single physical unit.

The application controller 200 may periodically control the AC power source 300 to connect and disconnect from the distribution line which is also connected to the application devices $100_1$ to $100_n$ to allow data communication between the application controller and the application devices, such as demand side management (DMR) messages or demand reduction (DR) requests. When the AC power source 300 is connected, the application devices are operated by the provided AC power. The application drivers 103 actuate the application loads 104 according to operation instructions either programmed at the application device or received from either the application controller or other application devices. For instance, in a lighting application, the application load 104 may be a lamp which can be operated with different dimming levels, depending on operation commands received by other lighting devices, such as user interfaces and/or sensors. During the AC power mode operation, the application devices may also charge their integrated energy storage 102, e.g. a battery via an AC battery charger, if these energy storages are rechargeable.

The change from the first mode to the second mode may be initiated based on a trigger received by the application controller 200 when the AC power source 300 is connected to the distribution line and the application devices $100_1$ to $100_n$ are operated by the provided AC power. Upon receiving this trigger, application controller 200 disconnects AC power source from the distribution line and the application devices $100_1$ to $100_n$ enter the second mode and exchange data via the distribution line. This trigger may be based on time such that a timer is set to generate the trigger for different pre-defined time instants or the trigger may be periodically generated. Application devices $100_1$ to $100_n$ may also generate this trigger and request for mode switch, e.g., when application devices $100_1$ to $100_n$ have to exchange the presence of a sensor data or battery state of charge etc. A sensor integrated in any of the application devices $100_1$ to $100_n$, based on an external signal from an auxiliary device or from any of the application devices $100_1$ to $100_n$ may generate such trigger. The sensor signal may be of different types, e.g., application devices $100_1$ to $100_n$ may need to form a group and to share their respective IDs. In case when the application devices $100_1$ to $100_n$ are luminaires, and when a user selects a dynamic/static scene to be rendered, the luminaires may request the communication mode to form a group to render the scene. The trigger can be generated by a low bandwidth signal received by the application controller 200 via the AC power line (e.g., by using PLC communication) to indicate that a high bandwidth data transmission is needed which requires to switch from the first mode to the second mode.

During communication periods, where for instance control commands, reports and/or operation conditions are exchanged, the application devices are operated using energy from the integrated energy storage 102. The AC power source 300 is disconnected from the distribution line during the communication mode. Data exchange within lighting systems (or even ambient data exchange needed for building management systems) is mostly of a low data volume and can occur with latency of seconds to few minutes. Therefore, to avoid noise on the power line in conventional power line communication, communication and power transmission between central controller and luminaires or among luminaires occurs in consecutive time slots. In cases where all batteries are fully charged, for instance in an office building on weekends and at night, the time slots for the data communication made may range up to 3-5 minutes. In such cases, the DC energy exchange mode may not be needed. The system may alternate from AC power mode to data communication wherein the AC power mode is used to recharge the battery. 3-5 minutes for a data communication interval are usually enough to transfer information regarding the battery state of charge, the presence of sensor data, temperature data, daylight data etc.

The time duration application devices $100_1$ to $100_n$ stay in the second mode depends on the amount of data to be exchanged. This time duration may be known from any previous communication such that the amount of to-be-transferred data can be inferred from any previous known communication. A memory unit (not shown in the figure) may be used to store the amount of to-be-transferred data which also specifies the required time period for the second mode. The trigger which is used to indicate the switch from the first mode to the second mode may also indicate the amount of to-be-transferred data and hence the time period of the second mode. The number of messages in the required communication, i.e., to-be-transferred data, may also be known e.g., in a hand-shaking process where negotiation between application devices $100_1$ to $100_n$ establishes the protocols of a communications channel.

Preferably, the application controller 200 and the application devices $100_1$ to $100_n$ support a further mode of operation, in which the AC power source 300 is switched-off and DC power is provided to power the power grid. The application controller 200 may control which application device $100_1$ to $100_n$ shall provide the power from its local energy storage 102 to the distribution line and which application device $100_1$ to $100_n$ may receive power from the distribution line for example depending on the respective power levels of the energy storages 102. A controller used to redistribute the DC power between the plurality of lighting units for instance in the event that DC power is low or exhausted in one of the plurality of lighting units is known from WO 2013/182927 A2 which is herewith incorporated by reference in its entirety. Optionally, power line communication is supported during the DC power mode, wherein any kind of modulation scheme known for power line communication may be used to transmit and receive data during the DC power mode. Thus, the DC power or battery buffered mode improves power line communication conditions due to noise from the mains power by disconnecting the mains power and thus the noise from the application supply grid.

Figure 2:
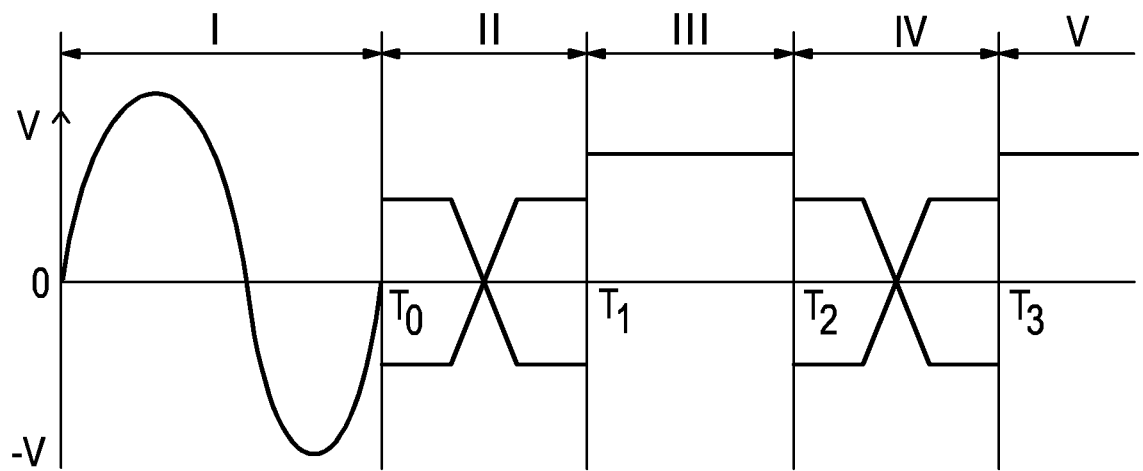
FIG. 2 exemplary and schematically shows a voltage level on a distribution line during different modes of operation of the application system shown in FIG. 1.

FIG. 2 exemplary and schematically shows a voltage level on the distribution line during the three different modes of operation described for example for the system according to FIG. 1. In the AC power mode I, AC power flows to the application devices such as luminaires of a lighting system from a power mains via one or more distribution lines forming an AC grid.

At instances of required data communication, e.g. instances of DSM or DR request, i.e. at time T0 the mains power is disconnected from the grid and the application devices, e.g. the luminaires of a lighting system and the central controller start operating in communication mode for a certain time period II, which usually lasts seconds or even minutes depending on the amount of data to be exchanged. Clock pulses generated by the central controller are broadcasted over the power line. The application devices, e.g. the luminaires switch into communication mode and synchronize their internal clock with the central controller before starting to transmit or receive data, e.g. one by one according to a predetermined protocol.

Application devices may transmit data indicative of their status like state of battery charge SOC, dimming level, ambient temperature etc. with the central controller during T0-T1. Once the data exchange is over, the central controller instructs all the luminaires to end communication mode. In the example shown in FIG. 2 the controller is not instructing the application devices to return into the AC power mode but to enter into a DC power mode for a predetermined time period III. The communication mode may for instance be interrupted by the central controller if one or more luminaires send an emergency signal/message that their power level is only sufficient to support them for a certain, e.g. short remaining time. In such case one of the two power modes may be initiated although there is still data issued for communication. In FIG. 2 the DC power and data transmission mode are applied periodically during time periods II, III, IV, V until no further data, e.g. DSM or DR request, are pending. The length of the data transmission periods II, IV and DC power periods III, V depends on the respective applications and may be set by the central controller or may be preprogrammed.

Figure 3:
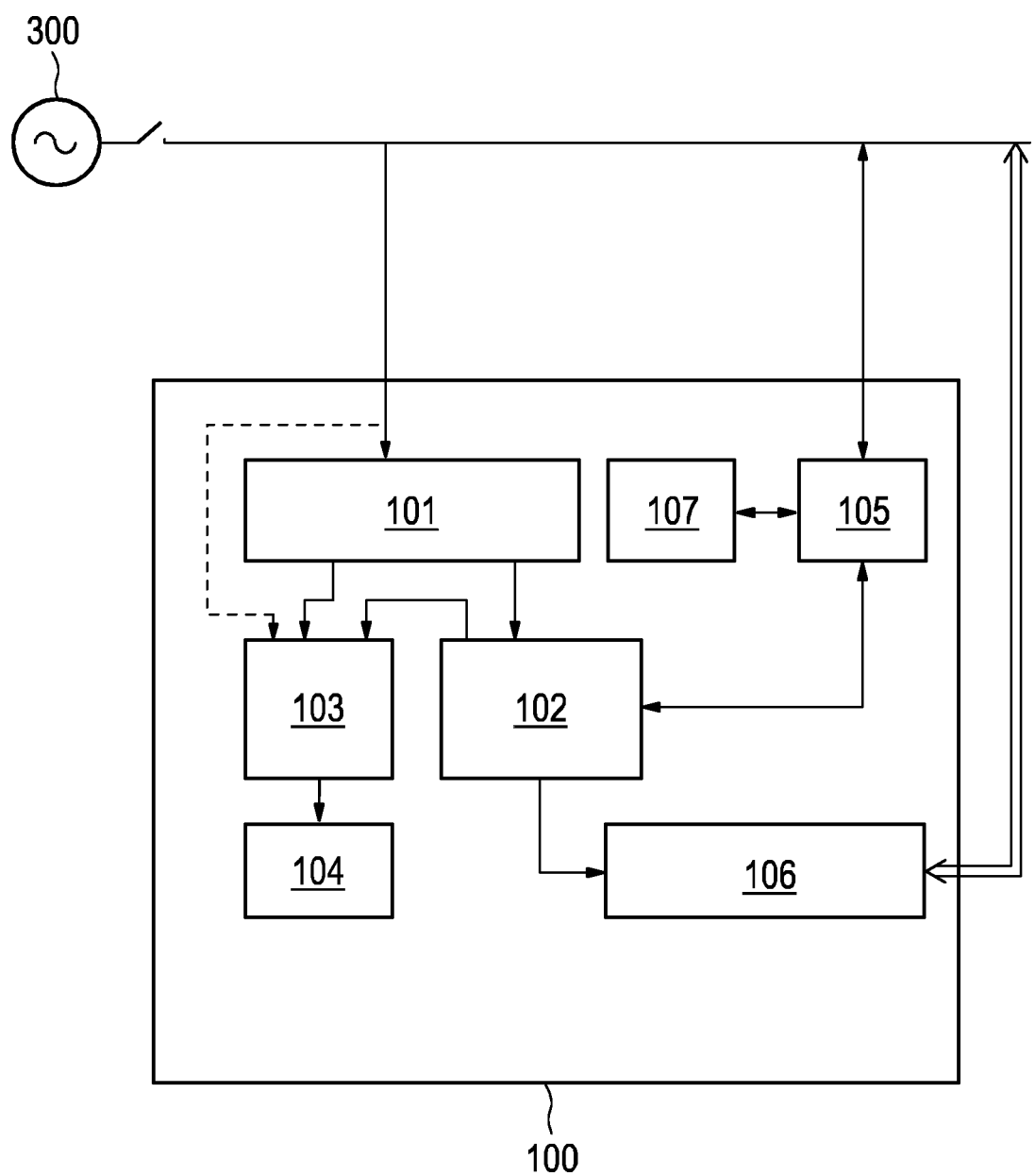
FIG. 3 exemplary and schematically shows an application device according to an embodiment of the present invention.

FIG. 3 exemplary and schematically shows an application device according to an embodiment of the present invention. In this embodiment, data and power transmission are implemented through connecting a bidirectional current control unit CCU 105, preferably in series with the energy storage 102, and a communication module 106 in different time slots to the distribution line. In time T0-T1, CCU 105 is disconnected from and communication module 106 is connected to the distribution line. In time T1-T2, CCU 105 is connected to and communication module 106 is disconnected from distribution line. CCU 105 is optional in case that the power from the energy storage is not shared with other luminaires connected to the distribution line. The mechanism of disconnecting and connecting the application devices from and to the distribution line can be implemented by switching means such as relays, solid state switches etc.

Preferably, circuitry in the power train like a preconditioner, e.g. a device intended to improve the quality of the power that is delivered to electrical load equipment, and lamp/battery drivers are used as the switching means to switch between the described modes. For instance, a switch in a central preconditioner may be deactivated to get the application system into the communication or the DC mode. The preconditioner and the lamps/battery chargers are disconnected from the distribution line to avoid interference between AC power conditioner and the DC bidirectional current control unit 105 to avoid recirculation of current going out from the battery and getting feedback by the power conditioner AC/DC charger circuit 101.

In the DC power mode, power line communication may be used, for instance to provide urgent messages from the central controller 200 to the respective application devices $100_1$ to $100_n$. In order to modulate and/or demodulate data signals onto the DC power signal, the application devices $100_1$ to $100_n$ may comprise a modulation/demodulation module 107 connected with the bidirectional current controller and control circuitry (not shown) to operate the application device.

Preferably, the central controller 200 monitors the power quality of the AC voltage and times DC power mode or communication mode periods when there is heavy noise in the AC voltage. For instance, a zero crossing detector may detect zero crossings of the AC voltage to determine the actual frequency. A PLL (phase locked loop) may reconstruct the normal mains frequency. When a large error between the normal (average) mains frequency and the actual AC frequency is detected, the AC power mode is terminated and the data communication or DC power mode are initiated, regardless of whether data is to be communicated or power is to be shared. That way, distortions in the mains power supply are kept away from the application devices, e.g. the luminaires, lowering the requirements for noise suppression even further and resulting in simpler and cheaper communication units in the application devices.

Figure 4:
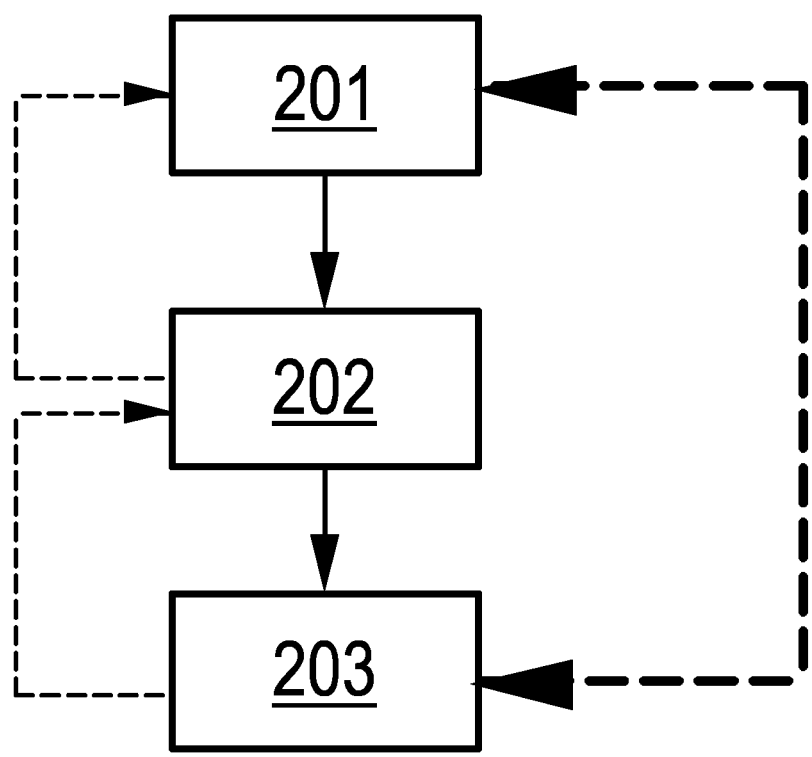
FIG. 4 exemplary and schematically shows a flow chart of a method for operating an application system according to an embodiment of the present invention.

FIG. 4 exemplary and schematically shows a flow chart of a method for operating an application system according to an embodiment of the present invention. In a first method step 201 corresponding to a first mode of operation, an AC power source is controlled to connect to the distribution line to provide power to one or more application devices via the distribution line. In a second method step 202 corresponding to a second mode of operation, the AC power source is controlled to disconnect from the distribution line and data transmission between the one or more application devices and between the one or more application devices and an application controller is enabled. In a third method step 203 corresponding to a third mode of operation, the AC power source is controlled to disconnect from the distribution line and DC power transmissions are enabled between the one or more application devices, wherein the DC power is provided from a respective energy storage of the one or more application devices. The method steps 201, 202 and 203 do not have to be provided in this order. Any order is applicable. Furthermore, in steps 202 and 203, upon a notification received from one or more of the application devices, the mode of operation may be changed to the first mode. For instance, if the energy stored in an energy storage of an application device reaches a critical limit, the application device may request to change to the first mode and recharge its energy storage with power provided from the AC power source. During the second mode, the request may simply be provided with a normal data transmission. In the third mode, such a request would have to be modulated onto the DC power signal. The change from the first mode to the second mode may be initiated periodically or upon request of an application device. For instance, an individual application device, e.g. a luminaire, might switch to battery operated mode from AC mode. The central controller could observe a difference between estimated power consumption and actual power and thus determined that one or more of the application devices has switched to the second mode. Upon that detection the central controller could initiate switching to the second mode and thus enable communication between the application devices and/or the central controller. The first mode may also be switched to the third mode, for instance in case the quality of the AC power signal does not fulfill a predetermined requirement, e.g. a lower threshold.

Procedures like controlling an AC power source, enabling data transmission between the one or more application devices, enabling DC power transmissions, etc. performed by one or several units or devices can be performed by any other number of units or devices. These procedures and/or the control of the application controller and devices in accordance with the method for operating an application system can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An application device comprising:
an energy storage,
a signal port connectable to a distribution line configured to:
in a first mode, receive power from an AC power source for operating the application device, and
in a second mode, exchange data via the distribution line;
wherein the first and second modes are applied consecutively and wherein the application device is powered with energy from the energy storage during the second mode; wherein the application device stays in the second mode for a time period depending on the amount of data to be exchanged.

2. The application device according to claim 1, wherein the signal port is further adapted to receive:
in a third mode, power from a DC power source for operating the application device.

3. The application device according to claim 1, wherein the signal port is further adapted to transmit:
in a third mode, power from the energy storage onto the distribution line.

4. The application device according to claim 2, wherein in the third mode, the signal port is further adapted to transmit or receive data modulated onto the DC power signal.

5. The application device according to claim 1, further comprising circuitry to monitor a status of the energy storage and submit a signal to an external controller, if the energy stored by the energy storage falls below a predetermined threshold to request operation in the first mode.

6. The application device according to claim 1, further comprising a bidirectional current controller and a communication module, both connectable to the distribution line, wherein
in the first mode, the current controller is connected to the distribution line to receive power from the external AC power source and the communication module is disconnected from the distribution line,
in the second mode, the current controller is disconnected from the distribution line and the communication module is connected to the distribution line, and
in a third mode, the current controller is connected to the distribution line to receive DC power from an external DC power source or to provide power from the energy storage to the distribution line.

7. The application device according to claim 6, further comprising a modulation-demodulation module connected to the bidirectional current controller, to modulate data onto the DC power signal provided on the distribution line or to demodulate data received with the DC power signal.

8. The application device according to claim 1 further comprising an energy storage charger, wherein in the first mode the signal port connectable to the distribution line is further configured to receive power from the AC power source for charging the energy storage by the energy storage charger.

9. The application device according to claim 2, further comprising an energy storage charger, wherein in the third mode the signal port connectable to the distribution line is further configured to receive power from the DC power source for charging the energy storage by the energy storage charger.

10. An application controller for use in the application device according to claim 1, wherein the application controller comprising:
   a signal port connectable to a distribution line, and
   wherein the application controller is configured to:
      in a first mode, control an AC power source to connect to the distribution line to provide power to an application device via the distribution line,
      in a second mode, control the AC power source to disconnect from the distribution line and to send a data transmission to the application device or to receive a data transmission from the application device; wherein the application device stays in the second mode for a time period depending on the amount of data to be exchanged;
   wherein the application device is powered with energy from the energy storage during the second mode; and,
   wherein the application controller switches between the first and second mode.

11. The application controller according to claim 10, wherein the application controller switches from the second mode to the first mode upon receipt of a signal from the application device indicating that a power stored by the energy storage of the application device has fallen below a predetermined threshold.

12. The application controller according to claim 10, further comprising a monitoring unit for monitoring a quality of the AC power in the first mode, wherein the application controller is configured to control the application device to switch to a third mode in which DC power is provided by an energy storage of the application device and transmitted via the distribution line as a power signal with or without a modulated data signal when the quality of the AC power drops below a certain value.

13. The application controller according to claim 12, wherein the monitoring unit comprises a phase locked loop detector to detect a zero crossing of the AC voltage to determine the AC frequency and wherein the application controller is configured to control the application device to switch to the third mode, if the AC frequency deviates from a nominal frequency by a predetermined amount.

14. The application controller according to claim 10, further comprising a monitoring unit for monitoring costs of the AC power in the first mode, wherein the application controller is configured to control the application device to switch to a third mode in which DC power is provided by an energy storage of the application device and transmitted via the distribution line as a power signal with or without a modulated data signal when the quality of the AC power drops below a certain value.

15. A method for operating an application system comprising one or more application devices and an application controller, the method comprising:
   in a first mode, controlling an AC power source to connect to the distribution line to provide power to an application device via the distribution line,
   in a second mode, controlling the AC power source to disconnect from the distribution line and enabling data transmission between the one or more application devices and between the one or more application devices and the application controller; wherein the application device stays in the second mode for a time period depending on the amount of data to be exchanged;
   in a third mode, controlling the AC power source to disconnect from the distribution line and enabling DC power transmissions between the one or more application devices.

* * * * *